(No Model.)

G. W. TARBELL.
CORN PLANTER.

No. 295,953. Patented Apr. 1, 1884.

2 Sheets—Sheet 1.

WITNESSES
F. L. Ourand
G. B. Harris

INVENTOR
G. W. Tarbell
by Cet Snowbo
Attorneys

N. PETERS, Photo-Lithographer, Washington, D. C.

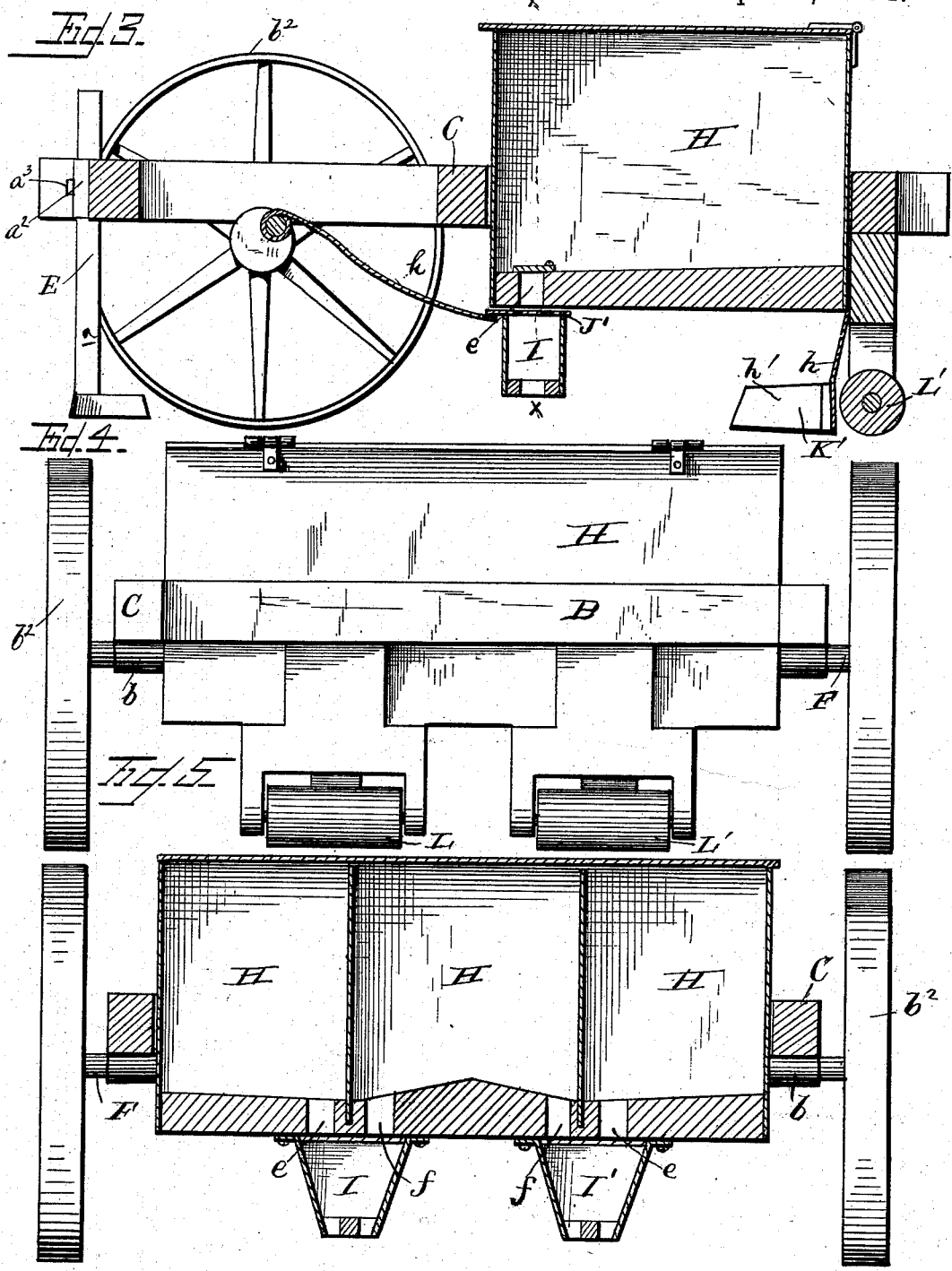

UNITED STATES PATENT OFFICE.

GEORGE WALTER TARBELL, OF SHEFFIELD, VERMONT.

CORN-PLANTER.

SPECIFICATION forming part of Letters Patent No. 295,953, dated April 1, 1884.

Application filed December 6, 1883. (No model.)

*To all whom it may concern:*

Be it known that I, GEO. W. TARBELL, a citizen of the United States, residing at Sheffield, in the county of Caledonia and State of Vermont, have invented a new and useful Corn-Planter, of which the following is a specification, reference being had to the accompanying drawings.

My invention relates to corn-planters; and it consists in the improved construction and combinations of parts hereinafter more fully described, whereby the furrow is opened, the seed and fertilizer dropped, and then covered and rolled.

Figure 1:
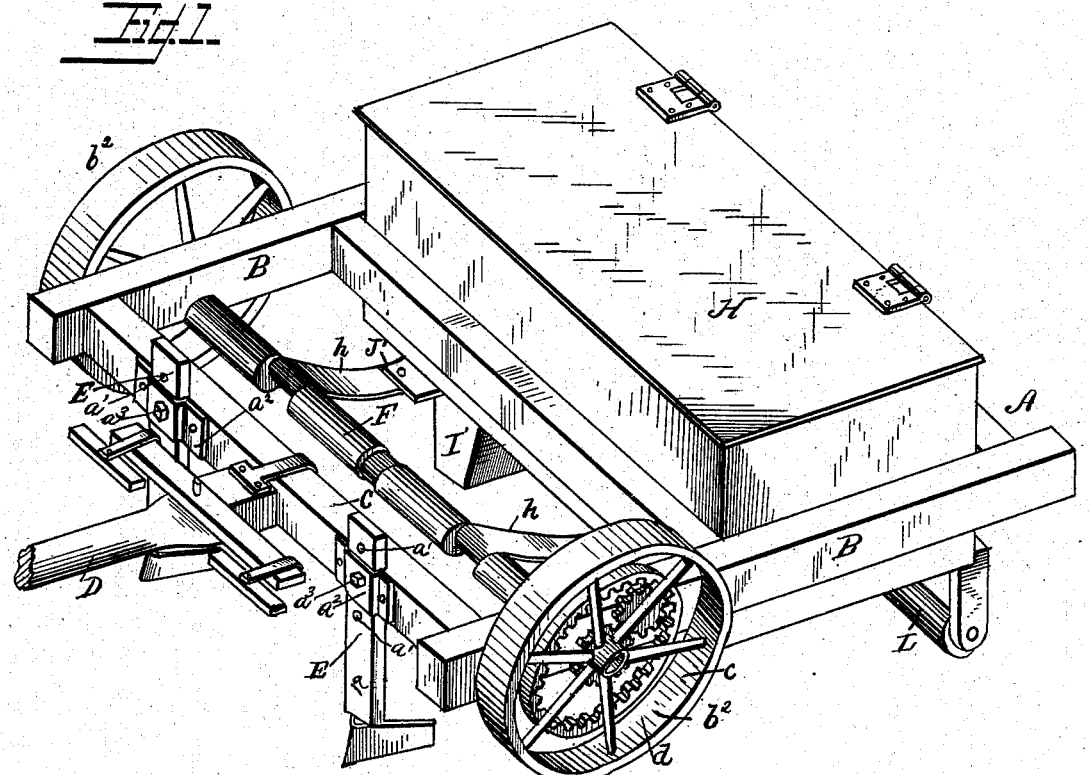
Figure 2:
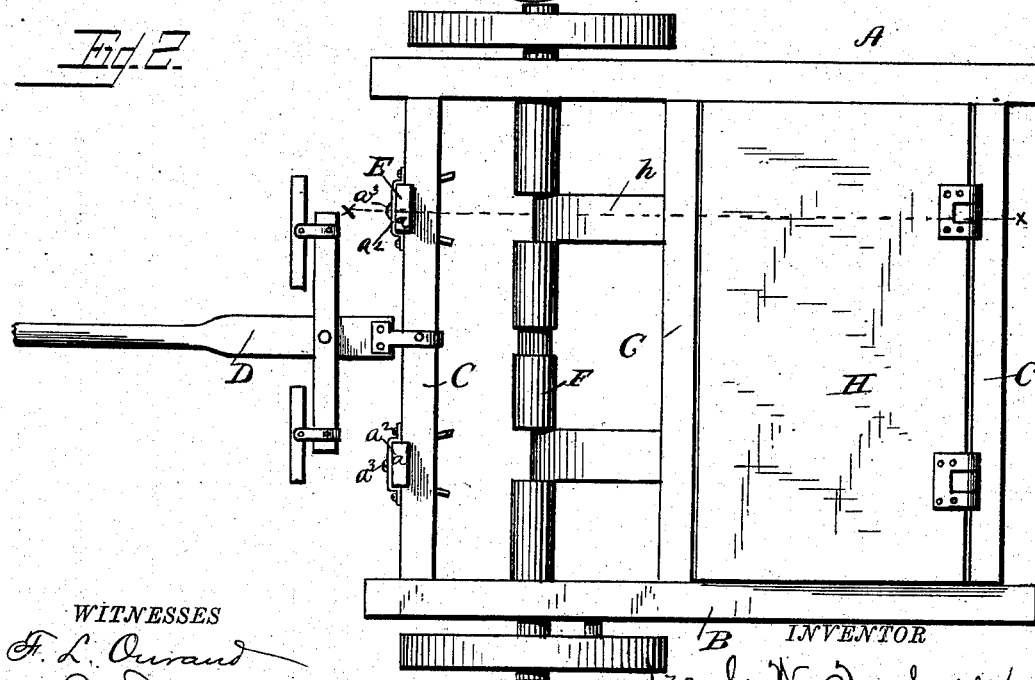

In the drawings, Figure 1 is a perspective view of my improved planter. Fig. 2 is a plan view of the same. Fig. 3 is a section on the line $x\ x$ of Fig. 2. Fig. 4 is a rear elevation, and Fig. 5 is a transverse sectional view.

A represents the frame, which consists of the longitudinal beams B and transverse beams C.

D represents the tongue, which may be of any suitable construction, and secured to the forward transverse bar C of the frame A.

E represents furrow-openers secured upon the forward transverse bar C, on each side of the tongue. These furrow-openers consist of a beam, $a$, having an opener secured at its lower end, and having perforations $a'$. This beam carrying the opener is vertically adjustable in the plate $a^2$ by means of a pin, $a^3$.

F represents the axle, which is journaled in bearings secured to the under side of the longitudinal beam B, just in rear of the forward transverse bar C, and carrying-wheels $b^2$, upon the inner faces or sides of which are arranged gear teeth or cogs $c$, adapted to mesh with gear-wheels $d$, rigidly mounted on the axle, whereby the axle is caused to revolve at a greater rate of speed than the carrying-wheels, for a purpose to be more fully described.

H represents the boxes for carrying the seed and fertilizer, the same being mounted between the longitudinal beams B and the rear and middle transverse bars C. This box H is divided into three compartments, the two side compartments being used for the seed, and the middle compartment being used for the fertilizer. The flooring to the seed-boxes is inclined toward the fertilizer-box, while the floor of the fertilizer-box is inclined outwardly from the center toward the seed-boxes on each side, and provided with suitable openings, $f$, to allow the fertilizer to be dropped. These openings $f$ are arranged in the forward corners of the fertilizer-box, adjacent to the openings $e$ of the corn-boxes, and separated by the partitions.

I I' represent feed-spouts secured to the under side of the feed-boxes, so that the corn or other seed and the fertilizer is dropped in these boxes together.

J J' represent slides or cut-offs arranged to slide between the upper edges of the feed-spouts and the under side of the feed-box. These slides are provided with openings, so that they will intermittingly register with the openings in the feed-boxes and allow the seed to drop at the proper intervals. The axle of the planter is cut away to form an eccentric, and the slides or cut-offs are connected thereto by plates $h$, having their ends bent or looped around said eccentric portion of the axle, and secured to the said plates by rivets or other suitable fastenings.

K K' represent coverers secured to the rear side of the seed-box, and between said seed-box and the rear transverse supporting-bar of the planter. These coverers consist of a plate, $h$, and a transverse plate, $h'$, secured to its lower end, and having its ends bent outwardly, as shown.

L L' represent rollers, which are mounted in brackets M, which are secured to the under side of the rear transverse bar C.

The operation is as follows: Upon the planter being moved forward by the team, the furrow will be opened by the triangular openers which are secured to the forward transverse beam, the carrying-wheels revolving the axle at a greater rate of speed than the wheels themselves, by means of the gear-connections described, and the slides are moved intermittingly backward and forward by means of the connection with the eccentric portion of the axle, thus allowing the seed and fertilizer to be dropped at the proper intervals. The seed is then covered by the coverers K K', and then rolled.

From the above description it will be apparent that the improvements embodied in my invention are simple, cheap, and that the planter is thoroughly effective in its operation.

Having fully described my invention, what I claim as new, and desire to secure by Letters Patent, is—

1. In a corn or seed planter, the combination, with a supporting-frame, of an axle mounted in bearings of said frame, wheels loosely mounted on the ends of said axle, and having gear-teeth arranged on their inner faces, adapted to mesh with gear-wheels secured upon the axle, substantially as set forth.

2. In a corn or other planter, the combination, with a supporting-frame, of an axle mounted in bearings of said frame, wheels loosely mounted on the ends of said axle, and having gear-teeth arranged on their inner faces, adapted to mesh with gear-wheels mounted upon said axle, the seed-box having suitable feed-spouts, slides, or cut-offs arranged between said box and spouts, plates connecting said slides with the axle, which is recessed to form an eccentric portion, whereby the corn or seed is dropped intermittingly, substantially as set forth.

In testimony that I claim the foregoing as my own I have hereto affixed my signature in presence of two witnesses.

GEORGE WALTER TARBELL.

Witnesses:
WM. GRAVES,
JACOB M. CASS.